United States Patent
Moon

(10) Patent No.: US 12,160,018 B2
(45) Date of Patent: Dec. 3, 2024

(54) STRUCTURALLY SUPPORTIVE ELECTRIC VEHICLE BATTERY BUSBAR

(71) Applicant: Polestar Performance AB, Gothenburg (SE)

(72) Inventor: Jongseok Moon, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 322 days.

(21) Appl. No.: 17/672,445

(22) Filed: Feb. 15, 2022

(65) Prior Publication Data
US 2023/0261328 A1    Aug. 17, 2023

(51) Int. Cl.
*H01M 50/505*     (2021.01)
*H01M 50/24*      (2021.01)
*H01M 50/528*     (2021.01)

(52) U.S. Cl.
CPC ......... *H01M 50/505* (2021.01); *H01M 50/24* (2021.01); *H01M 50/528* (2021.01); *H01M 2220/20* (2013.01)

(58) Field of Classification Search
CPC .. H01M 50/505; H01M 50/24; H01M 50/528; H01M 2220/20
See application file for complete search history.

(56) References Cited

U.S. PATENT DOCUMENTS

| | | | |
|---|---|---|---|
| 2002/0158309 A1* | 10/2002 | Swanson | H01L 29/0821 257/E21.372 |
| 2016/0172642 A1* | 6/2016 | Hughes | H01M 50/227 429/130 |
| 2016/0365551 A1* | 12/2016 | Maguire | H01M 10/647 |

FOREIGN PATENT DOCUMENTS

| | | | | |
|---|---|---|---|---|
| DE | 102012221124 A1 | 5/2014 | | |
| EP | 3389113 A1 * | 10/2018 | | B60L 11/1877 |
| EP | 3389113 B1 | 3/2020 | | |

OTHER PUBLICATIONS

Application No. EP23156398.2, Extended European Search Report, Mailed on Jul. 11, 2023, 9 pages.

* cited by examiner

*Primary Examiner* — Jane J Rhee
(74) *Attorney, Agent, or Firm* — Kilpatrick Townsend & Stockton LLP

(57) ABSTRACT

A structurally supportive battery busbar configured to enable distribution of electrical energy amongst a plurality of battery cells and to provide structural rigidity to the plurality of battery cells, the structurally supportive busbar including one or more bands configured to band the plurality of battery cells together under a tensile force to form a battery module, and one or more structural reinforcement beams configured to traverse at least partially along a length or width of the battery module, the at least one of the bands or one or more structural reinforcement beams include an electrically conductive portion configured to couple the plurality of battery cells together for electrical distribution throughout the battery module.

20 Claims, 5 Drawing Sheets

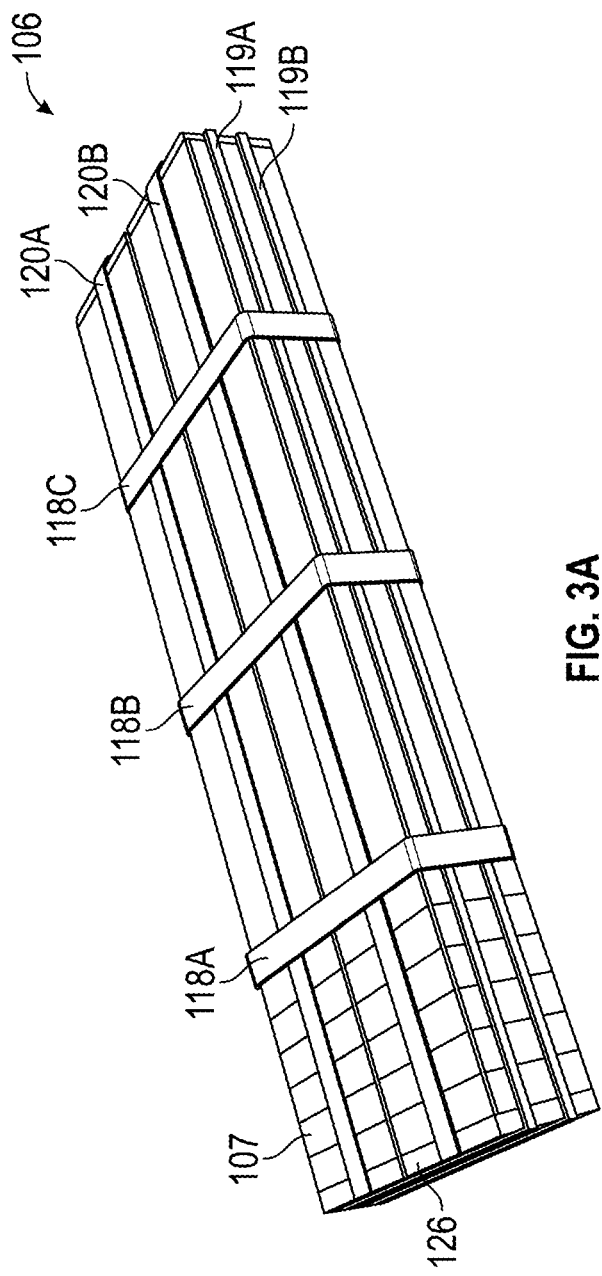
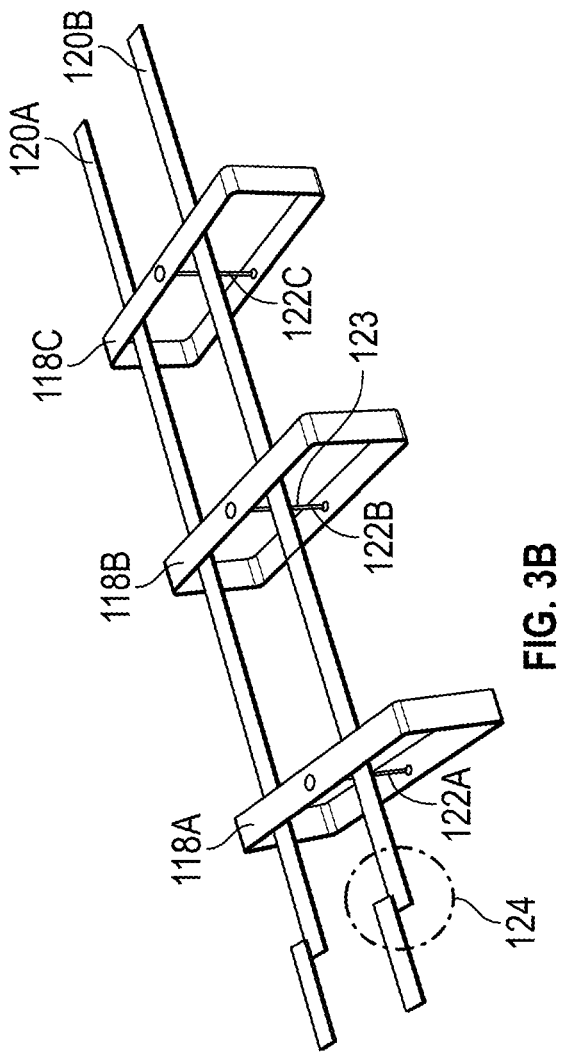
FIG. 3A
FIG. 3B

STRUCTURALLY SUPPORTIVE ELECTRIC VEHICLE BATTERY BUSBAR

TECHNICAL FIELD

The present disclosure relates generally to batteries for electric vehicles, and more particularly to an electric vehicle battery bus bar configured to enable distribution of electrical energy amongst a plurality of battery cells and to provide structural rigidity to a battery pack.

BACKGROUND

Electric vehicles are becoming increasingly popular as consumers look to decrease their environmental impact and improve air quality. Instead of a traditional internal combustion engine, electric vehicles include one or more motors powered by a rechargeable battery pack. Most rechargeable battery packs are made up of a plurality of individual battery cells configured to provide electrical power to the one or more motors.

Conventionally, the rechargeable battery packs are enclosed in a structurally supportive enclosure or housing (often referred to as a "battery tray") representing a bottom and one or more sides of a structural vessel defining a compartment. Typically such battery trays are constructed of a rigid metal, such as an aluminum alloy, or the like. For improved structural rigidity, often the battery tray includes additional rigid structures, such as cross members, which can provide structural support to the battery pack as well as surfaces within the compartment on which other components of the battery pack can be affixed.

The individual battery cells are often grouped into distinct clusters (sometimes referred to as "battery modules"). In addition to the battery modules, a variety of other components can be packed into the compartment before a rigid cover is affixed to a top surface of the battery tray, thereby sealing the compartment. These components can include electrical current transmission systems, safety systems, battery management systems, and current management systems. An electrically conductive battery bus bar, typically comprised of a copper wire and strips, interconnects the various components and enables power distribution within the battery pack.

Although conventional electric vehicle battery packs have been found to be generally effective in storing and delivering electrical energy for use in powering the one or more motors, electric vehicles are typically much heavier than their internal combustion counterparts. That is, electric vehicle battery packs, although necessary, add a significant amount of mass to the vehicle, which negatively affects performance (e.g., hinders 0-60 mph acceleration time and 60-0 mph braking distance), as well as decreases the effective range of the vehicle. The present disclosure addresses this concern.

SUMMARY OF THE DISCLOSURE

Embodiments of the present disclosure provide an electric vehicle battery busbar that functions to both enable power distribution within a battery pack, as well as provide structural support to the battery pack. In contrast to previous systems in which the structural battery pack supportive members and the electrical distribution busbar have been separate systems, providing a structurally supportive battery busbar that electrically couples the battery cells and other battery components together significantly reduces the need for a heavy battery tray. For example, in some embodiments, the structurally supportive battery busbar can band the plurality of cells together in a rigid block, such that the overall shape of the battery pack is largely maintained by the plurality of cells themselves, with the structurally supportive battery busbar serving to secure the plurality of cells in one or more distinct groups for improved strength. In some embodiments, the structurally supportive battery bus bar can further optionally include one or more beams running at least a partial length or width of the battery pack for additional support, as well as for power distribution within the battery pack. Accordingly, embodiments of the present disclosure enable the relatively heavy battery tray to be replaced by a thin, non-structurally supportive sheath, such as a weather resistant shrink wrap or the like.

As a protective feature, in some embodiments, the structurally supportive battery busbar can include one or more breakaway mechanisms configured to shear or otherwise sever an electrical connection along the battery busbar, thereby electrically disconnecting or isolating one or more individual battery cells within the battery pack. Such a protective feature may be particularly useful in the event of a collision where one or more battery cells may be damaged and prone to a thermal event, which if left unaddressed could lead to a thermal runaway of the entire battery pack with the potential to cause damage to the vehicle and injury to the occupants.

One embodiment of the present disclosure provides a structurally supportive battery busbar configured to enable distribution of electrical energy amongst a plurality of battery cells and to provide structural rigidity to the plurality of battery cells, the structurally supportive busbar including one or more bands configured to band the plurality of battery cells together under a tensile force to form a battery module, one or more structural reinforcement beams configured to traverse at least partially along a length or width of the battery module, wherein at least one of the bands or one or more structural reinforcement beams include an electrically conductive portion configured to couple the plurality of battery cells together for electrical distribution throughout the battery module.

In one embodiment, at least a portion of the one or more bands or one or more structural reinforcement beams include an insulated portion to define an electrical path for distribution of electrical energy amongst the plurality of battery cells. In one embodiment, the plurality of individual battery cells are banded together into two or more or more battery modules representing distinct groups of individual battery cells. In one embodiment, one or more protective sheath is positioned over the structurally supportive battery busbar and plurality of battery cells. In one embodiment, the protective sheath is a non-structurally supportive membrane configured to inhibit an intrusion of moisture into the plurality of cells. In one embodiment, the protective sheath comprises a shrink wrap material. In one embodiment the structurally supportive battery busbar further includes one or more anchor mounts configured to operably couple the battery pack to a vehicle. In one embodiment the structurally supportive battery busbar further includes one or more breakaway mechanisms configured to sever an electrical connection along the structurally supportive battery busbar to affect electrical isolation of one or more battery cells of the plurality of battery cells. In one embodiment, the one or more breakaway mechanism includes a first angled face and a second angled face configured to slide relative to one another upon application of an external force of a defined magnitude.

Another embodiment of the present disclosure provides an electric vehicle battery pack including a plurality of battery cells, and a structurally supportive battery busbar including one or more bands configured to band the plurality of battery cells together under a tensile force to form a battery module, and one or more structural reinforcement beams configured to traverse at least partially along a length or width of the battery module, wherein at least one of the bands or one or more structural reinforcement beams include an electrically conductive portion configured to couple the plurality of battery cells together for electrical distribution throughout the battery module.

In one embodiment, at least a portion of the one or more bands or one or more structural reinforcement beams include an insulated portion to define an electrical path for distribution of electrical energy amongst the plurality of battery cells. In one embodiment, the plurality of individual battery cells are banded together into two or more battery modules representing distinct groups of individual battery cells. In one embodiment, the electric vehicle battery pack further includes at least one of an electrical transmission system, safety system, battery management system, or current management system. In one embodiment, one or more protective sheath is positioned over the structurally supportive battery busbar and plurality of battery cells. In one embodiment, the protective sheath is a non-structurally supportive membrane configured to inhibit an intrusion of moisture into the plurality of cells. In one embodiment, the protective sheath comprises a shrink wrap material. In one embodiment, the electric vehicle battery pack further includes one or more anchor mounts configured to operably couple the battery pack to a vehicle. In one embodiment, the electric vehicle battery pack further includes one or more breakaway mechanism configured to sever an electrical connection along the structurally supportive battery busbar to affect electrical isolation of one or more battery cells of the plurality of battery cells. In one embodiment, the one or more breakaway mechanism includes a first angled face and a second angled face configured to slide relative to one another upon application of an external force of a defined magnitude.

Another embodiment of the present disclosure provides an electric vehicle including a vehicle frame, a plurality of battery cells, and a structurally supportive battery busbar including one or more bands configured to band the plurality of battery cells together under a tensile force to form a battery module, and one or more structural reinforcement beams configured to traverse at least partially along a length or width of the battery module, wherein at least one of the bands or one or more structural reinforcement beams include an electrically conductive portion configured to couple the plurality of battery cells together for electrical distribution throughout the battery module and couple the battery module to the vehicle frame.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 3A is a perspective view depicting a battery module including a structurally supportive battery busbar, in accordance with an embodiment of the disclosure.

FIG. 3B is a perspective view depicting the structurally supportive battery busbar of FIG. 3A, in accordance with an embodiment of the disclosure.

Figure 1:
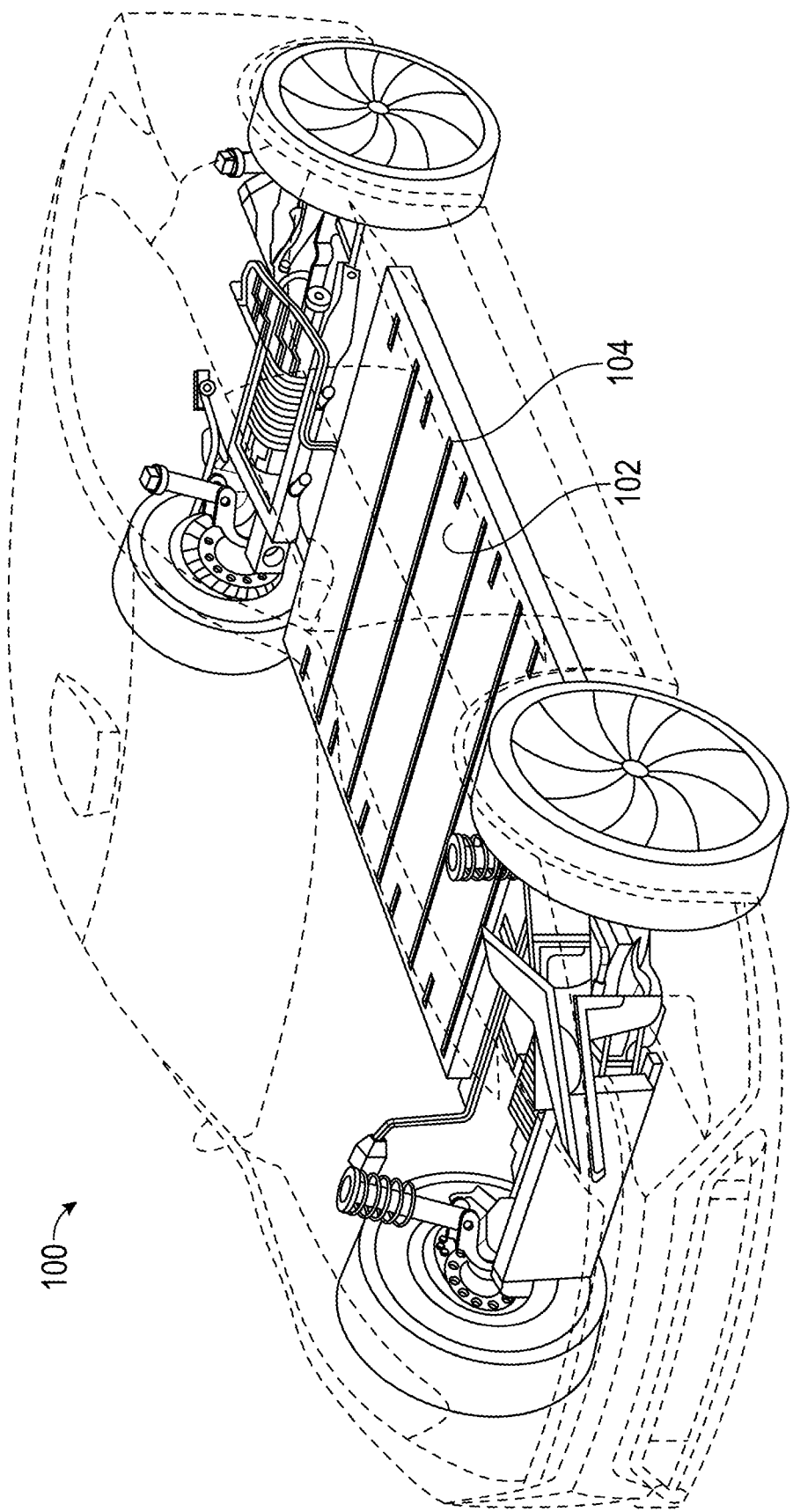
FIG. 1 is an electric vehicle comprising a lighter weight electric vehicle battery pack including a structurally supportive battery bus bar in place of a rigid battery enclosure, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an electric vehicle 100 comprising an electric vehicle battery pack 102 including a structurally supportive battery bus bar 104 configured to enable power distribution and provide structural support to the battery pack 102 is depicted in accordance with an embodiment of the disclosure. As depicted, the battery pack 102 can represent a distinct unit separable from the electric vehicle 100, the battery pack 102 containing clusters of individual battery cells (sometimes referred to as "battery modules") and other battery related components. The assembled battery pack 102 can be mounted to the frame or chassis 104 of the vehicle 100 and in some embodiments can be positioned adjacent to a cabin floor of the vehicle 100, thereby maintaining a low center of gravity. For example, the battery pack 102 may be positioned below the passenger compartment, which is generally considered an ideal location as the battery pack 102 maintains a low center of gravity of the vehicle 100, and is spaced away from the outer body of the vehicle, and therefore less prone to being damaged in a collision.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented.

Additionally, the terms "battery," "cell," and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configurations. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 2:
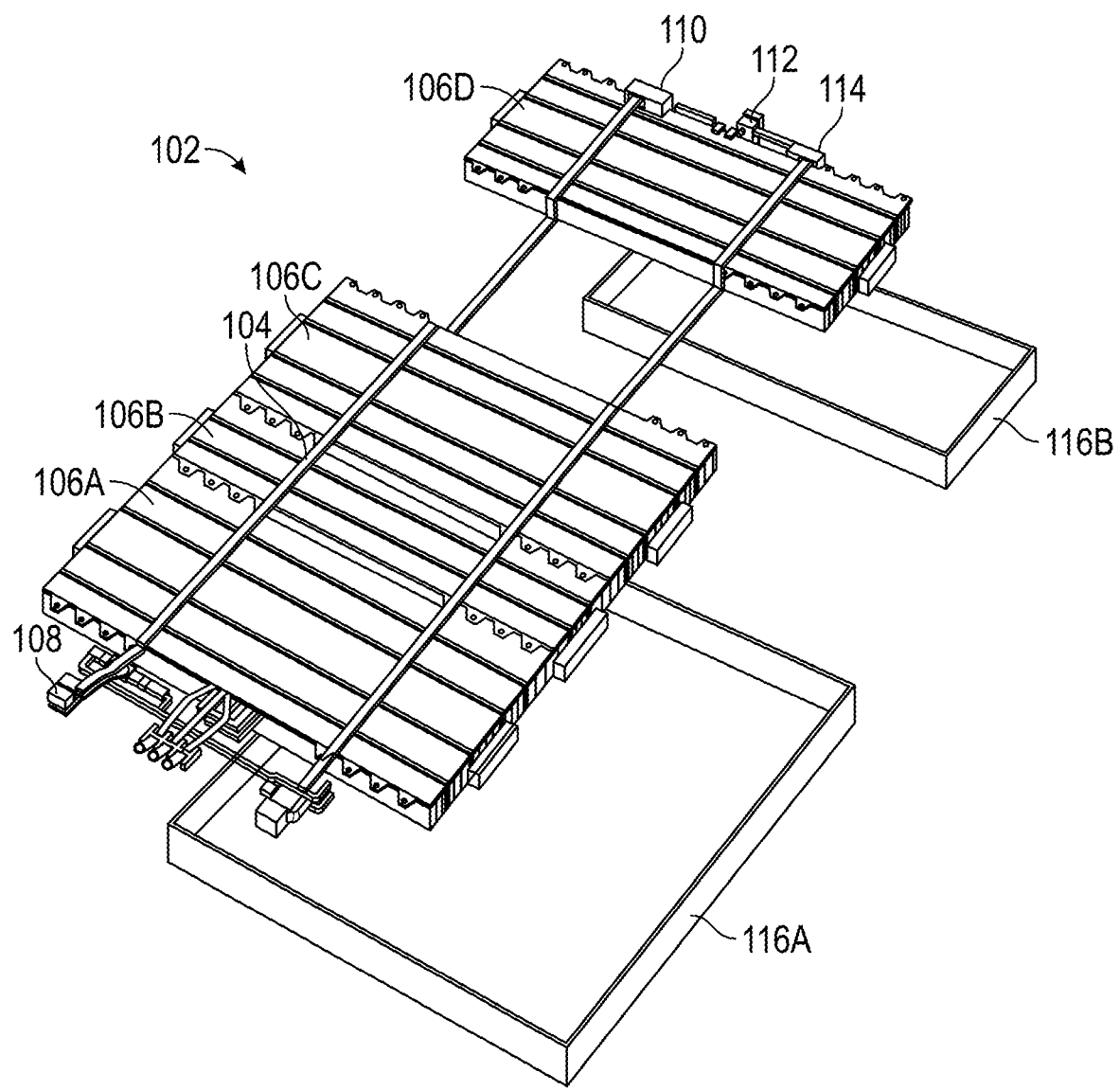
FIG. 2 is a perspective view depicting an electric vehicle battery pack including a structurally supportive battery bus bar configured to enable power distribution and provide structural support to the battery pack, in accordance with an embodiment of the disclosure.

With additional reference to FIG. 2, a perspective view of an electric vehicle battery pack 102 including a structurally supportive battery bus bar 104 configured to enable power distribution and provide structural support to the battery pack 102 is depicted in accordance with an embodiment of the disclosure. As depicted, the individual battery cells can be grouped into distinct clusters 106A-D (sometimes referred to as "battery modules"). In addition to the battery modules 106A-D, the battery pack 102 can include a variety of other components, including an electrical current transmission system 108, safety system 110, battery management system 112 (including current management system 114), and other components, with the structurally supportive battery bus bar 104 electrically coupling and structurally banding together the various components 106A-D, 108, 110, 112, 114. Once the components have been banded together via the structurally supportive battery bus bar 104, one or more protective sheathes 116A/B can be can be positioned over the components, thereby shielding the components from environmental elements, such as moisture and dirt.

With additional reference to FIGS. 3A-B, a perspective view of a battery module 106 and a portion of the structurally supportive battery busbar 104 are depicted in accordance with an embodiment of the disclosure. As depicted, the structurally supportive battery busbar 104 can include one or more bands 118A-C configured to band a plurality of battery cells 107 and other components together under a tensile force. For example, in some embodiments, the bands 118A-C can wrap around an outer perimeter of a plurality of battery cells 107 (e.g., in an x-, y- or z-direction) thereby banding the plurality of cells 107 together to form a unitary block or battery module 106, which can be coupled to one or more other battery modules to form a complete battery pack 102. A second set of bands 119A/B, which may or may not be electrically conductive, can be added to band the plurality of cells 107 together along a different axis (e.g., orthogonal to the first one or more bands 118A-C). Accordingly, an overall structural shape of the battery module 106 can be largely formed by the collective group of individual battery cells and other battery components. That is, rather than relying on a conventional battery tray or other housing into which the battery cells and other components are positioned (which adds a significant amount of weight to the vehicle 100), with the aid of a structurally supportive battery busbar 104, embodiments of the present disclosure rely on the inherent physical structure of the battery components themselves to form the structure of the battery pack 102.

For further structural reinforcement (in addition to the structure of the individual battery cells banded together with bands 118, 119) the structurally supportive busbar 104 can optionally include one or more beams 120A/B running at least a partial length or width of the battery pack 102. In some embodiments, a combination of the one or more bands 118 and one or more beams 120 can couple the individual battery cells 107 together for electrical distribution throughout the battery pack 102.

Figure 4:
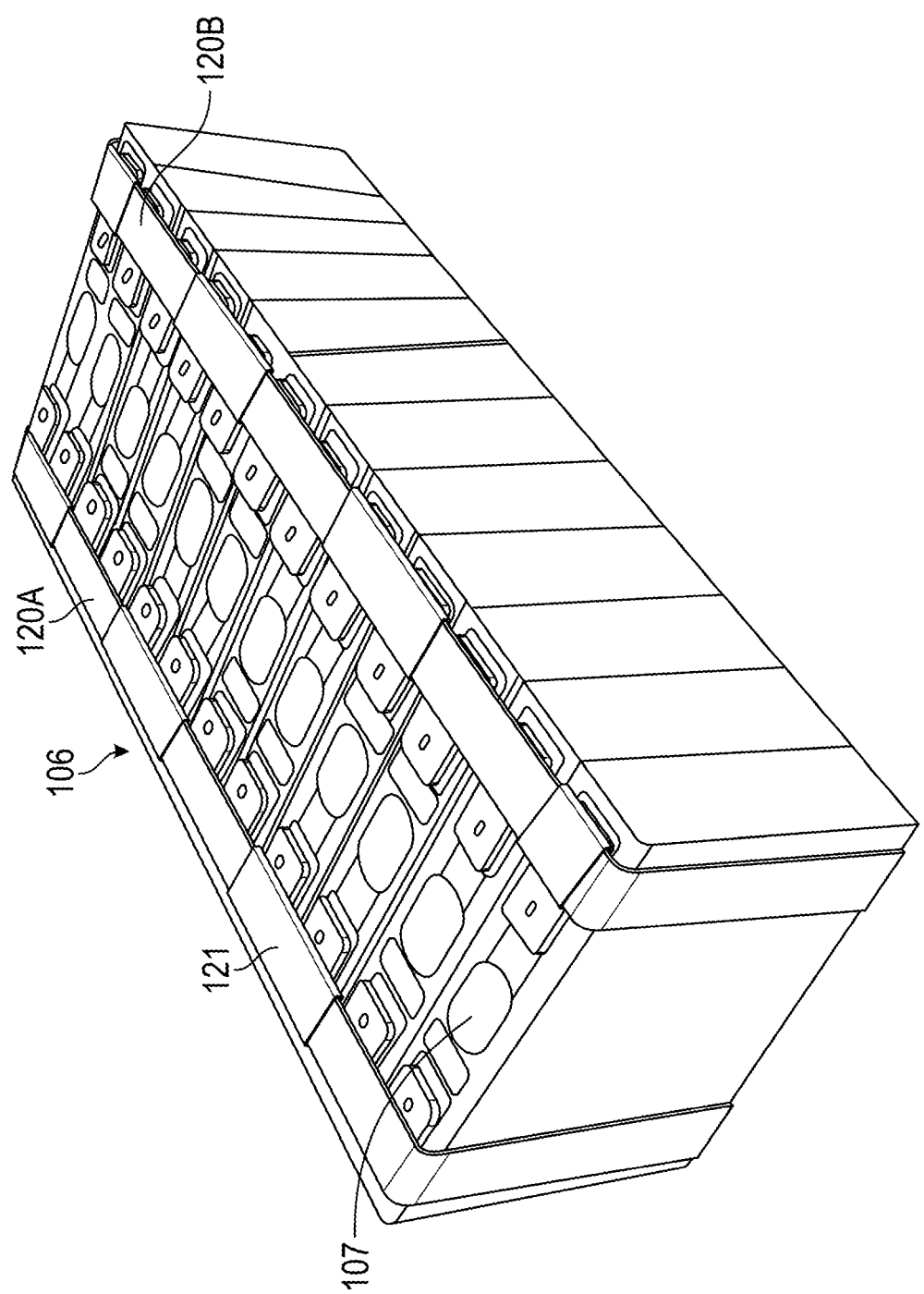
FIG. 4 is a partial perspective view depicting a battery module with a structurally supportive battery bus bar including insulated portions to define an electrical path for distribution of electrical energy amongst a plurality of battery cells, in accordance with an embodiment of the disclosure.

With additional reference to FIG. 4, in some embodiments, at least portions of the bands 118, 119 or reinforcement beams 120 can include insulated portions 121 (e.g., non-electrically conductive portions) to define an electrical path for distribution of electrical energy amongst the plurality of battery cells 107. In some embodiments, the insulated portions 121 can be an insulated sleeve positioned at least partially around the bands 118, 119 or reinforcement beams 120; although other configurations of the insulated portions 121 are also contemplated.

Thereafter, the banded together battery cells 107 and other components can be covered with a protective sheath 116 or other shielding layer to inhibit the intrusion of water, dirt and other foreign matter into the battery pack 102. However, unlike conventional electric vehicle battery packs, the protective sheath 116 need not be a relatively heavy structurally supportive member (e.g., an aluminum battery tray or the like). Rather, embodiments of the protective sheath 116 can be formed as a relatively thin, lightweight membrane, such as a plastic or rubberized shrink wrap material or the like. In other embodiments, the protective sheath 116 can be a rubberized pan or underside vehicle wear resistant material configured to couple to a bottom portion of the vehicle 100, thereby at least partially sealing the battery pack 102 between the sheath 116 and a bottom of the vehicle 100. As depicted in FIG. 2, in one embodiment, two or more protective sheaths 116 can be used to seal different portions of the battery pack 102; although other configurations are also contemplated.

To aid in securing the battery pack 102 to the bottom side of a vehicle 100, in some embodiments, the structurally supportive busbar 104 can include one or more anchor mounts 122A-C configured to operably couple the battery pack 102 to the vehicle 100 or other structure. To isolate electrical contact between the structurally supportive busbar 104 and the chassis of the vehicle, in some embodiments, at least one of the one or more anchor mounts 122 or a fastener 123 traversing through the one or more anchor mounts 122 can be constructed or aligned with an insulative (e.g., non-electrically conductive) material.

As a protective feature, in some embodiments, the structurally supportive battery busbar 104 can include one or more breakaway mechanisms 124 configured to shear or otherwise sever an electrical connection along the battery busbar 104, thereby electrically disconnecting or isolating battery cells 107 within the battery pack 102. Such a protective feature may be particularly useful in the event of a collision where one or more battery cells 107 may be damaged and prone to a thermal event. In some embodiments, the structurally supportive busbar 104 can further include one or more end plates 126, which can be configured to provide structural support to the battery pack 102, as well as to serve as a cushion, bumper or crumple zone in the event of a collision or impact.

It has been observed that optimal battery cell performance is more likely to occur within a desired temperature range (e.g., 40-45° C., etc.), with a maximum/not to exceed temperature (e.g., 60° C.) being above the desired temperature range. In rare cases, individual battery cells within a battery pack 102 can exhibit thermal characteristics above a desired temperature range (e.g., above the maximum/not to exceed temperature), which may result in a failure (e.g., thermal runaway, etc.) of the individual cell. The battery pack 102 has many sources of heat which may contribute to abnormal thermal characteristics of any given cell (e.g., above a desired temperature range). The source of heat may be created internally (e.g., within the cells) or may originate from an external source (e.g., outside of the cell or battery tray 104). One internal heat source can occur as a result of damage (e.g., impact, crushing, etc.). During such an occurrence, heat energy from the cell exhibiting the thermal characteristics can propagate into nearby and adjacent cells, thereby creating the potential for a chain reaction thermal event across multiple battery cells.

The heat produced by a high rate of discharge within an individual cell is generally a function of an electrical current and an internal electrical resistance of the cell. The cells are generally more sensitive to high temperatures when a voltage within the cell is relatively high. This volatility is dependent upon cell chemistry (e.g., lithium-ion reaction, etc.) and varies among different types of cells contemplated for use. In the event that a single cell experiences an over temperature event, the heat produced by the overheated cell may transfer heat energy to adjacent cells 107 (e.g., within a module 106) thereby raising the temperature of the adjacent cells to a point of propagation of the thermal event throughout the entire battery pack 102. For example, self-ignition of a battery cell may occur when the temperature of the cell reaches a temperature in a range of between about 120° C. and about 150° C.

Conventional electric vehicle designs typically position the battery pack 102 below the passenger compartment, which is generally considered an ideal location as the battery pack maintains a low center of gravity of the vehicle, and is spaced away from the outer body of the vehicle, and therefore less prone to being damaged in a collision. Conventional positioning of battery packs under the passenger compartment has proven effective in inhibiting excessive damage to the battery pack in the event of a full frontal or rear collision. By contrast, conventional designs are less effective at preventing damage from a side impact. Specifically, when a side of the vehicle is impacted, a rocker assembly positioned along a lower side of the vehicle can collapse inwardly toward the battery pack 102, potentially damaging the battery cells 107/modules 106 positioned therein.

In rare circumstances, particularly when subjected to damage from a collision, individual battery cells within the battery pack can overheat. In extreme circumstances, the propagation of heat from the cell experiencing a thermal event can transfer to adjacent cells thereby raising the temperature of the adjacent cells to a point of propagation of the thermal event throughout the entire battery pack (sometimes referred to as a "thermal runaway"), thus destroying the entire battery pack and potentially the electric vehicle. To inhibit such a chain reaction thermal event, in some embodiments, the structurally supportive battery busbar 104 can include one or more breakaway mechanisms 124 configured to shear or otherwise sever an electrical connection along the battery busbar 104 for reducing damage to the battery pack 102 due to a load externally applied in to the vehicle 100. Specifically, in some embodiments, the one or more breakaway mechanisms 124 can be configured to cause a rapid disconnection or isolation of battery cells 107 within the battery pack 102, for the purpose of inhibiting further damage to the vehicle and/or injury to the occupants thereof.

Figure 5A:
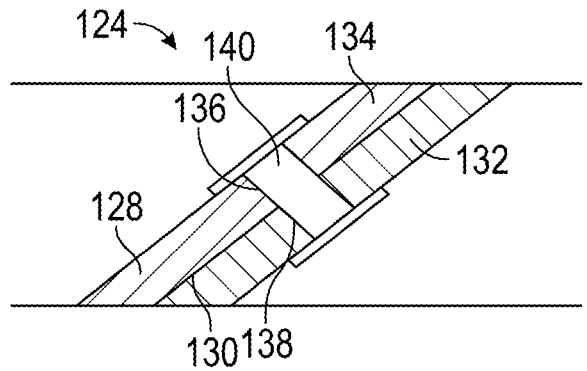
FIG. 5A is a cross-sectional view depicting a breakaway mechanism configured to cause a rapid disconnection or isolation of battery cells within the battery pack, in accordance with an embodiment of the disclosure.
Figure 5B:
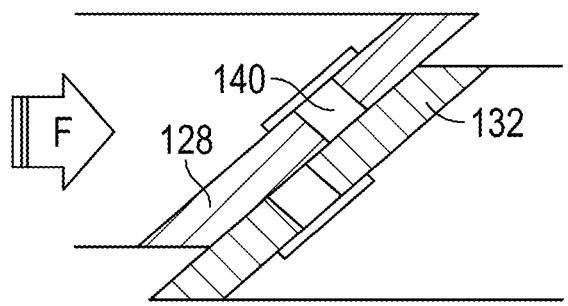
FIGS. 5B-C depict the breakaway mechanism of FIG. 5A following the application of an external force, in accordance with an embodiment of the disclosure.
Figure 5C:
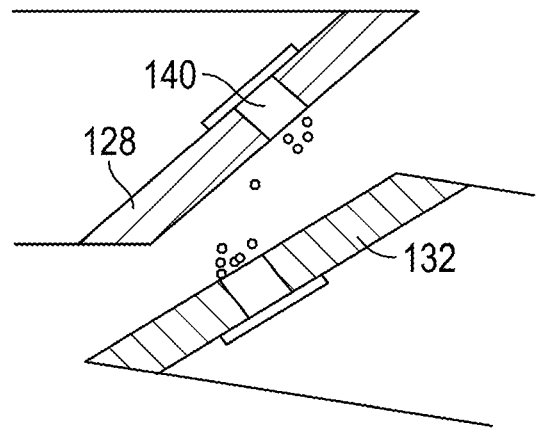

Referring to FIGS. 5A-C, a breakaway mechanism 124 configured to cause a rapid disconnection or isolation of battery cells 107 within the battery pack 102, is depicted in accordance with an embodiment of the disclosure. As illustrated, FIG. 5A depicts the breakaway mechanism 124 in an initial configuration, while FIGS. 5B-C depict the breakaway mechanism 124 following the application of an external force (F) from an impact.

In some embodiments, the breakaway mechanism 124 can include a first connection member 128, wherein the first connection member 128 has an angled face 130 positioned at an acute angle relative to a horizontal axis (x- or y-axis) of the battery pack 102. For example, in some embodiments, the angled face 130 of the first connection member 128 can be positioned at a downward facing acute angle (e.g., 45°, etc.) with respect to a horizontal axis. For example, in some embodiments, the first connection member 128 can be positioned in proximity to an exterior edge of the battery pack 102, where the application of an external force as a result of an impact is likely to occur.

A second connection member 132 having a corresponding second angled face 134 can be configured to mate with the first connection member 128, such that the angled faces 130, 134 are positioned against one another in a generally planar configuration. In some embodiments, the second connection member 132 can be positioned inboard of the first connection member 128 on the battery pack 102; although other embodiments are also contemplated.

In embodiments, an aperture 136, 138 can be defined in the first and second connection members 128,132, such that a shear or breakaway element 140 can be positioned therein, thereby coupling the first connection member 128 to the second connection member 132. In the event of a side impact, a force (F) imparted on the first connection member 128 can create a shear force between the first angled face 130 and the second angled face 134. As depicted in FIG. 5B, where the shear force exceeds a defined threshold, the breakaway element 140, which can be designed to shear at a designated shear force, can separate, breaking into two or more parts, thereby providing a disconnection between the first member 128 and the second member 132. Thereafter, as depicted in FIG. 5C, the second member 132 can separate from the first member 128 (e.g., though a deformation of the battery pack, etc.), thereby causing a rapid disconnection or isolation of battery cells 107 within the battery pack 102, for the purpose of inhibiting progression of a potential thermal event.

The invention is further illustrated by the following embodiments:

An electric vehicle battery pack comprising:
a plurality of battery cells; and
a structurally supportive battery busbar including one or more bands configured to band the plurality of battery cells together under a tensile force to form a battery module, and one or more structural reinforcement beams configured to traverse at least partially along a length or width of the battery module, wherein at least one of the bands or one or more structural reinforcement beams include an electrically conductive portion configured to couple the plurality of battery cells together for electrical distribution throughout the battery module.

A system or method according to any embodiment, wherein at least a portion of the one or more bands or one or more structural reinforcement beams include an insulated portion to define an electrical path for distribution of electrical energy amongst the plurality of battery cells.

A system or method according to any embodiment, wherein the plurality of individual battery cells are banded together into two or more or more battery modules representing distinct groups of individual battery cells.

A system or method according to any embodiment, further comprising at least one of an electrical transmission system, safety system, battery management system, or current management system.

A system or method according to any embodiment, wherein one or more protective sheath is positioned over the structurally supportive battery busbar and plurality of battery cells.

A system or method according to any embodiment, wherein the protective sheath is a non-structurally supportive membrane configured to inhibit an intrusion of moisture into the plurality of cells.

A system or method according to any embodiment, wherein the protective sheath comprises a shrink wrap material.

A system or method according to any embodiment, further comprising one or more anchor mounts configured to operably couple the battery pack to a vehicle.

A system or method according to any embodiment, further comprising one or more breakaway mechanism configured to sever an electrical connection along the structurally supportive battery busbar to affect electrical isolation of one or more battery cells of the plurality of battery cells.

A system or method according to any embodiment, wherein the one or more breakaway mechanism includes a first angled face and a second angled face configured to slide relative to one another upon application of an external force of a defined magnitude.

An electric vehicle comprising the electric vehicle battery pack according to any embodiment.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A structurally supportive battery busbar configured to enable distribution of electrical energy amongst a plurality of battery cells and to provide structural rigidity to the plurality of battery cells, the structurally supportive battery busbar comprising:
   one or more bands configured to band the plurality of battery cells together under a tensile force to form a battery module; and
   one or more structural reinforcement beams configured to traverse at least partially along a length or width of the battery module,
   wherein at least one of the bands or the one or more structural reinforcement beams include an electrically conductive portion configured to electrically couple the plurality of battery cells together for electrical distribution throughout the battery module.

2. The structurally supportive battery busbar of claim 1, wherein at least a portion of the one or more bands or the one or more structural reinforcement beams include an insulated portion to define an electrical path for distribution of electrical energy amongst the plurality of battery cells.

3. The structurally supportive battery busbar of claim 1, wherein the plurality of battery cells are banded together into two or more or more battery modules representing distinct groups of battery cells.

4. The structurally supportive battery busbar of claim 1, wherein one or more protective sheath is positioned over the structurally supportive battery busbar and the plurality of battery cells.

5. The structurally supportive battery busbar of claim 4, wherein the protective sheath is a non-structurally supportive membrane configured to inhibit an intrusion of moisture into the plurality of battery cells.

6. The structurally supportive battery busbar of claim 4, wherein the protective sheath comprises a shrink wrap material.

7. The structurally supportive battery busbar of claim 1, further comprising one or more anchor mounts configured to operably couple a battery pack that includes the plurality of battery cells to a vehicle.

8. The structurally supportive battery busbar of claim 1, further comprising one or more breakaway mechanism configured to sever an electrical connection along the structurally supportive battery busbar to affect electrical isolation of one or more battery cells of the plurality of battery cells.

9. The structurally supportive battery busbar of claim 8, wherein the one or more breakaway mechanism includes a first angled face and a second angled face configured to slide relative to one another upon application of an external force of a defined magnitude.

10. An electric vehicle battery pack comprising:
    a plurality of battery cells; and
    a structurally supportive battery busbar including one or more bands configured to band the plurality of battery cells together under a tensile force to form a battery module, and one or more structural reinforcement beams configured to traverse at least partially along a length or width of the battery module, wherein at least one of the bands or the one or more structural reinforcement beams include an electrically conductive portion configured to electrically couple the plurality of battery cells together for electrical distribution throughout the battery module.

11. The electric vehicle battery pack of claim 10, wherein at least a portion of the one or more bands or the one or more structural reinforcement beams include an insulated portion to define an electrical path for distribution of electrical energy amongst the plurality of battery cells.

12. The electric vehicle battery pack of claim 10, wherein the plurality of battery cells are banded together into two or more or more battery modules representing distinct groups of individual battery cells.

13. The electric vehicle battery pack of claim 10, further comprising at least one of an electrical transmission system, safety system, battery management system, or current management system.

14. The electric vehicle battery pack of claim 10, wherein one or more protective sheath is positioned over the structurally supportive battery busbar and the plurality of battery cells.

15. The electric vehicle battery pack of claim 14, wherein the protective sheath is a non-structurally supportive membrane configured to inhibit an intrusion of moisture into the plurality of battery cells.

16. The electric vehicle battery pack of claim 14, wherein the protective sheath comprises a shrink wrap material.

17. The electric vehicle battery pack of claim 10, further comprising one or more anchor mounts configured to operably couple the electric vehicle battery pack to a vehicle.

18. The electric vehicle battery pack of claim 10, further comprising one or more breakaway mechanism configured to sever an electrical connection along the structurally supportive battery busbar to affect electrical isolation of one or more battery cells of the plurality of battery cells.

19. The electric vehicle battery pack of claim 10, wherein the one or more breakaway mechanism includes a first angled face and a second angled face configured to slide relative to one another upon application of an external force of a defined magnitude.

20. An electric vehicle comprising:
a vehicle frame;
a plurality of battery cells; and
a structurally supportive battery busbar including one or more bands configured to band the plurality of battery cells together under a tensile force to form a battery module, and one or more structural reinforcement beams configured to traverse at least partially along a length or width of the battery module, wherein at least one of the bands or the one or more structural reinforcement beams include an electrically conductive portion configured to electrically couple the plurality of battery cells together for electrical distribution throughout the battery module and couple the battery module to the vehicle frame.

* * * * *